US010100857B2

(12) United States Patent
Marshman et al.

(10) Patent No.: US 10,100,857 B2
(45) Date of Patent: Oct. 16, 2018

(54) W-SHAPED WINGED SPRING CLIP WITH AT LEAST ONE REINFORCING GUSSET

(71) Applicant: FORD GLOBAL TECHNOLOGIES, LLC, Dearborn, MI (US)

(72) Inventors: David Paul Marshman, Walnut, CA (US); Diego Santillan Gutierrez, Tizayuca (MX); Fernando Paisano Rodriguez, San Andres Cholula (MX); Federico Perez Lecuona, Iztapalapa (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/254,033

(22) Filed: Sep. 1, 2016

(65) Prior Publication Data
US 2018/0058484 A1    Mar. 1, 2018

(51) Int. Cl.
*F16B 2/22* (2006.01)
*B60R 13/00* (2006.01)
*F16B 5/06* (2006.01)
*F16B 21/08* (2006.01)

(52) U.S. Cl.
CPC ............... *F16B 2/22* (2013.01); *B60R 13/00* (2013.01); *F16B 5/065* (2013.01); *F16B 21/086* (2013.01)

(58) Field of Classification Search
CPC .................... F16B 2/22; B60R 13/00
See application file for complete search history.

(56) References Cited

U.S. PATENT DOCUMENTS

| | | | | |
|---|---|---|---|---|
| 3,015,866 A | * | 1/1962 | Elms | F16B 5/125 24/293 |
| 3,210,032 A | | 10/1965 | Van Slyke | |
| 3,811,154 A | * | 5/1974 | Lindeman | F16B 21/02 174/138 D |
| 3,852,849 A | * | 12/1974 | Pestka | H05K 7/142 361/804 |
| 3,889,320 A | | 6/1975 | Koscik | |
| 3,921,261 A | * | 11/1975 | Fisher | F16B 21/02 24/339 |
| 4,337,774 A | * | 7/1982 | Perlin | A61B 17/122 24/536 |
| 4,619,365 A | * | 10/1986 | Kelly | B65D 5/006 206/503 |
| 4,811,922 A | * | 3/1989 | Yoneyama | H02G 3/26 174/72 A |
| 4,927,306 A | | 5/1990 | Sato | |
| 5,014,952 A | * | 5/1991 | Petrohilos | A47B 57/44 108/108 |
| 5,191,513 A | * | 3/1993 | Sugiura | H05K 7/142 174/138 D |
| 5,689,863 A | * | 11/1997 | Sinozaki | F16B 19/1081 24/297 |
| 6,012,691 A | * | 1/2000 | van Leeuwen | F16L 3/24 248/228.3 |
| 6,079,486 A | * | 6/2000 | Cennamo | H01L 23/4093 165/185 |

(Continued)

*Primary Examiner* — David M Upchurch
(74) *Attorney, Agent, or Firm* — Vichit Chea; King & Schickli, PLLC (57) ABSTRACT

A spring clip includes a body having (a) a base, (b) a support post carried on the base, (c) a first cantilever bar carried on the support post, (d) a second cantilever bar carried on the support post and (e) at least one gusset reinforcing the first and second cantilever bars.

10 Claims, 6 Drawing Sheets

(56) References Cited

U.S. PATENT DOCUMENTS

| | | |
|---|---|---|
| 7,036,779 B2 | 5/2006 | Kawaguchi et al. |
| 7,152,281 B2 * | 12/2006 | Scroggie ............. B60R 13/0206 |
| | | 24/289 |
| 7,320,157 B2 | 1/2008 | Lubera et al. |
| 7,351,023 B2 * | 4/2008 | Scroggie ................. F16B 5/123 |
| | | 24/297 |
| 7,354,102 B2 | 4/2008 | Cave et al. |
| 7,549,830 B2 * | 6/2009 | Cooley ................ F16B 21/086 |
| | | 24/297 |
| 7,878,749 B2 * | 2/2011 | Edland ................ F16B 21/086 |
| | | 24/297 |
| 7,950,115 B2 * | 5/2011 | Spitz ....................... F16B 21/02 |
| | | 24/289 |
| 8,109,705 B1 * | 2/2012 | Brown .................... F16B 13/04 |
| | | 248/304 |
| 8,936,420 B2 | 1/2015 | Scroggie et al. |
| 8,979,460 B2 | 3/2015 | Ostergren |
| 9,079,341 B2 | 7/2015 | Risdale et al. |
| 9,121,426 B2 | 9/2015 | Jagoda |
| 2003/0156917 A1 * | 8/2003 | Heflin ................. F16B 19/1081 |
| | | 411/45 |
| 2006/0230586 A1 | 10/2006 | Maki et al. |
| 2007/0125004 A1 | 6/2007 | Conner et al. |
| 2007/0125729 A1 * | 6/2007 | Krueger ............. A47G 23/0208 |
| | | 211/60.1 |
| 2008/0066266 A1 | 3/2008 | Scroggie et al. |
| 2011/0197405 A1 | 8/2011 | Kato et al. |
| 2012/0257924 A1 | 10/2012 | Andrews |
| 2013/0011188 A1 | 1/2013 | Donnelly |

* cited by examiner

W-SHAPED WINGED SPRING CLIP WITH AT LEAST ONE REINFORCING GUSSET

TECHNICAL FIELD

This document relates generally to the fastener field and, more particularly, to a new and improved W-shaped winged spring clip with an integral 4-way locator that is particularly useful in automotive applications to connect plastic parts to sheet metal.

BACKGROUND

Various types of fasteners including, for example, bolts/nuts, metal clips, plastic clips or the like may be utilized to secure a plastic part to a substrate such as a sheet metal part. Significantly, every added fastener increases the part cost and weight of the assembly. More specifically, fastener usage requires additional operations at the assembly plant or at the plastic part manufacturer and every additional operation increases the required manpower, process cost and production time. In addition, each fastener has a risk of producing squeaks and rattles. Further, added, separate fasteners have the risk of being missing or mismatched during assembly.

This document relates to a new and improved W-shaped winged spring clip with an integral 4-way locator. Advantageously, the spring clip includes doubled blocked lateral wings or cantilever bars structured to dissipate stress concentrations. The spring clip eliminates the need for additional, separate fasteners thereby reducing the weight and cost of the assembly. It also provides a robust and stronger, more durable joint clamping between a plastic part and a sheet metal part while maintaining proper position and alignment through assembly and vehicle operation and substantially eliminating the risk of squeaks and rattles.

The spring clip also includes reinforcing ribs or gussets that add extra strength. Further, the spring clip has a low insertion effort and functions to locate, lock and retain parts together in a single snapping action.

SUMMARY

In accordance with the purposes and benefits described herein, a new and improved spring clip is provided. That spring clip includes a body having (a) a base, (b) a support post, (c) a first cantilever bar carried on the support post, (d) a second cantilever bar carried on the support post and (e) at least one gusset reinforcing the first cantilever bar and the second cantilever bar.

The spring clip may include a first gusset extending between the support post and the first cantilever bar. The spring clip may include a second gusset extending between the support post and the second cantilever bar. Further, the spring clip may include a third gusset extending between the first cantilever bar, the second cantilever bar and the support post.

The first cantilever bar may include a first bend adjacent the support post. Further, the first cantilever bar may form a first neck with the support post. In such embodiments, the first gusset may extend inside the first bend inside the first neck. Similarly, the second cantilever bar may include a second bend adjacent the support post and the second cantilever bar may form a second neck with the support post. In such embodiments, the second gusset may extend inside the second bend inside the second neck. In addition, the third gusset may extend outside the first bend and the second bend between the first cantilever bar, the second cantilever bar and the support post.

In the following description, there are shown and described several preferred embodiments of the spring clip. As it should be realized, the spring clip is capable of other, different embodiments and its several details are capable of modification in various, obvious aspects all without departing from the spring clip as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the spring clip and together with the description serve to explain certain principles thereof. In the drawing figures:

FIGS. 5 and 6 are perspective views illustrating how the spring clip, illustrated in FIGS. 1 and 2, is utilized to secure a plastic part to a workpiece such as a sheet metal body component. FIG. 5 illustrates how the spring clip on the plastic part is aligned with a receiving aperture in the sheet metal body component. FIG. 6 clearly shows the plastic part secured to the sheet metal body component by the spring clip.

Reference will now be made in detail to the present preferred embodiment of the spring clip, illustrated in the accompanying drawing figures.

DETAILED DESCRIPTION

Figure 1:
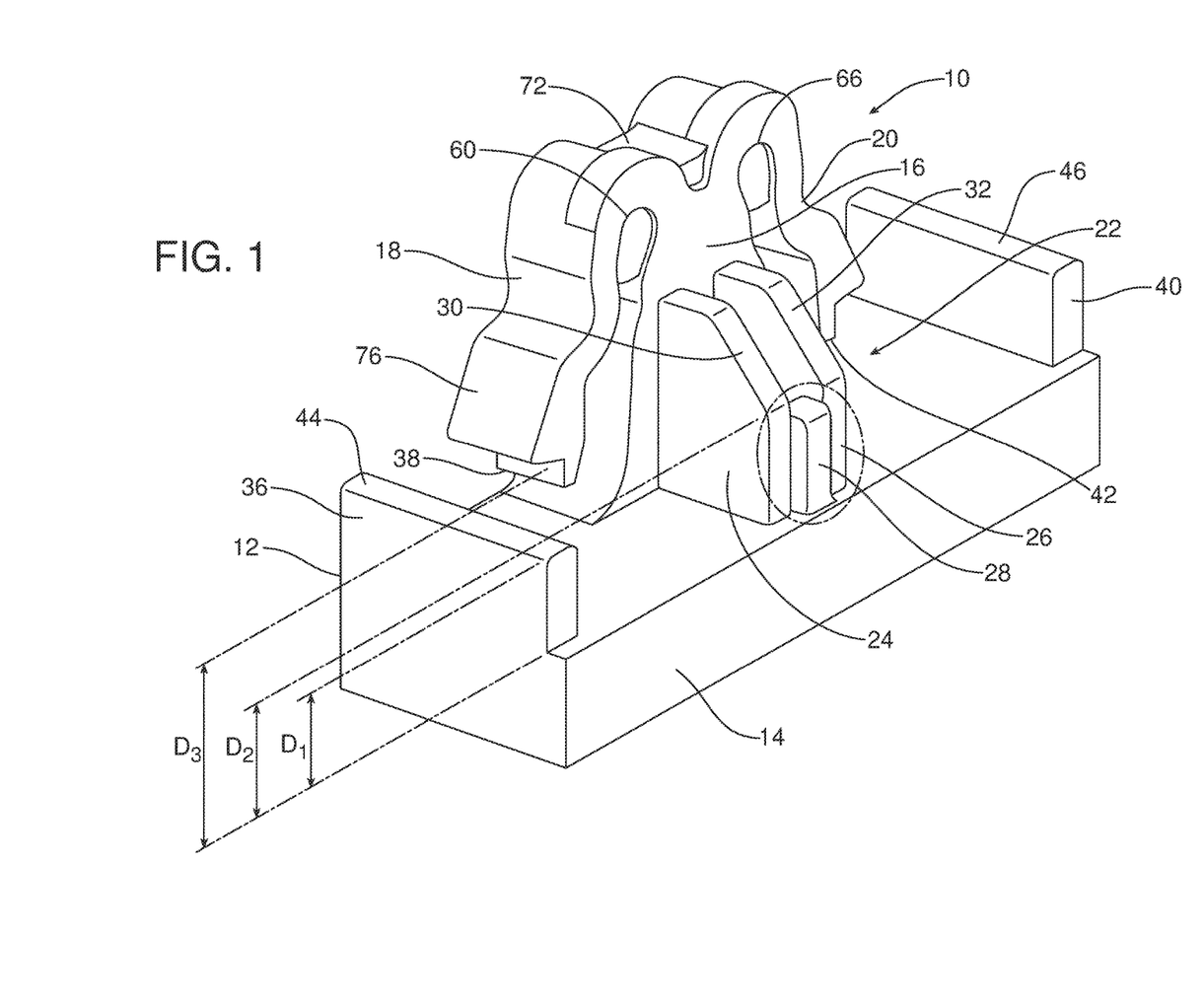
FIG. 1 is a perspective view of the W-shaped winged spring clip incorporating an integral 4-way locator.
Figure 2:
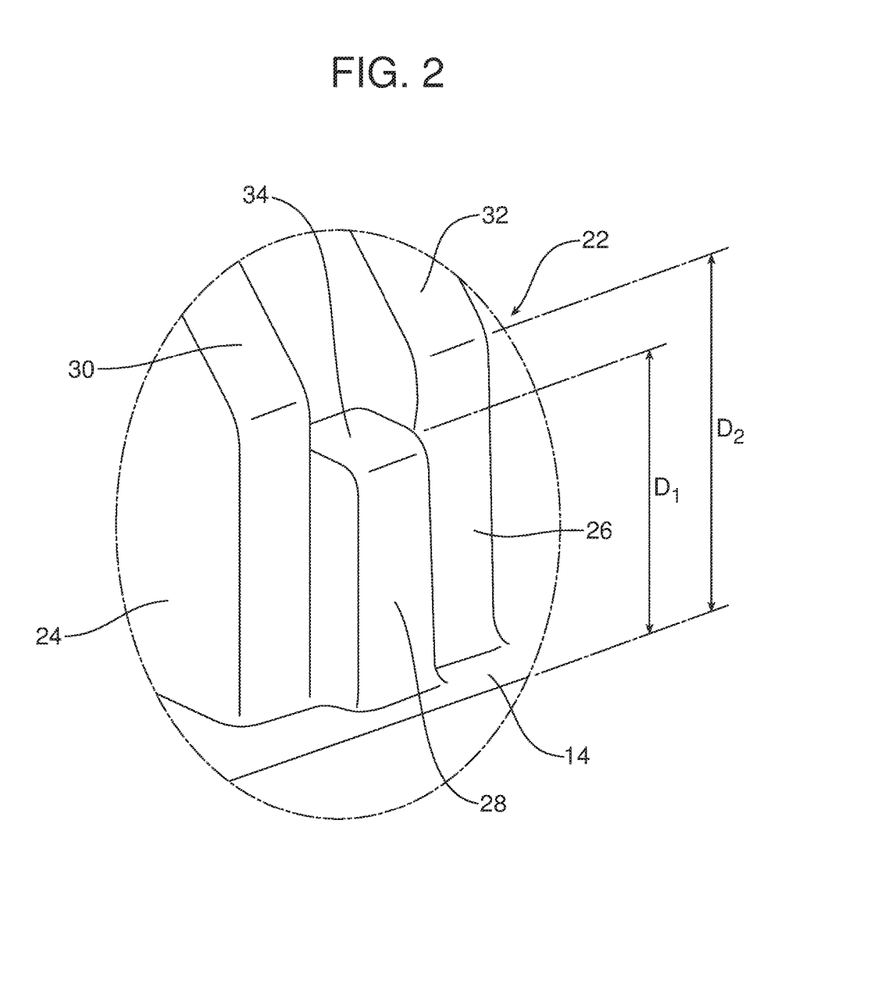
FIG. 2 is a detailed perspective view of the 4-way locator of the spring clip illustrated in FIG. 1.

Reference is now made to FIGS. 1 and 2 illustrating the spring clip 10. The spring clip 10 includes a body 12 having a base 14 and a support post 16 carried on the base. A first cantilever bar 18 is carried on the support post 16. A second cantilever bar 20 is also carried on the support post 16. In the illustrated embodiment, the first cantilever bar 18 is oriented so as to be opposed to the second cantilever bar 20.

In addition, the body 12 includes a 4-way locator 22 which is fixed to the base 14 on one side of the support post 16. The body 12 may be molded from a single piece of plastic or composite material so that the base 14, support post 16, first cantilever bar 18, second cantilever bar 20 and 4-way locator 22 are integral with one another.

As best illustrated in FIG. 2, the 4-way locator 22 includes a first beveled sidewall 24, a second beveled sidewall 26 and a first tunable rib 28 between the first beveled sidewall and the second beveled sidewall. More specifically, the first tunable rib 28 projects outwardly, away from the support post 16, the first beveled sidewall 24 and the second beveled sidewall 26.

As clearly illustrated in FIG. 2, the first beveled sidewall 24 has a first edge bevel 30 and the second beveled sidewall 26 has a second edge bevel 32. In the illustrated embodiment the first edge bevel 30 and the second edge bevel 32 are aligned.

The first tunable rib 28 has a first support edge 34. The first support edge 34 is spaced a first distance $D_1$ from the base 14. In contrast, the first edge bevel 30 and the second edge bevel 32 are both spaced a second distance $D_2$ from the base 14. The distance $D_1<D_2$.

As best illustrated in FIG. 1, the base 14 also includes a second tunable rib 36 that is carried on the base adjacent a first distal end 38 of the first cantilever bar 18 and a third tunable rib 40 carried on the base adjacent a second distal end 42 of the second cantilever bar 20. As shown, the second tunable rib 36 has a second support edge 44 and the third tunable rib 40 has a third support edge 46. The second edge 44 and the third support edge 46 are both spaced the first distance $D_1$ from the base 14.

Figure 3:
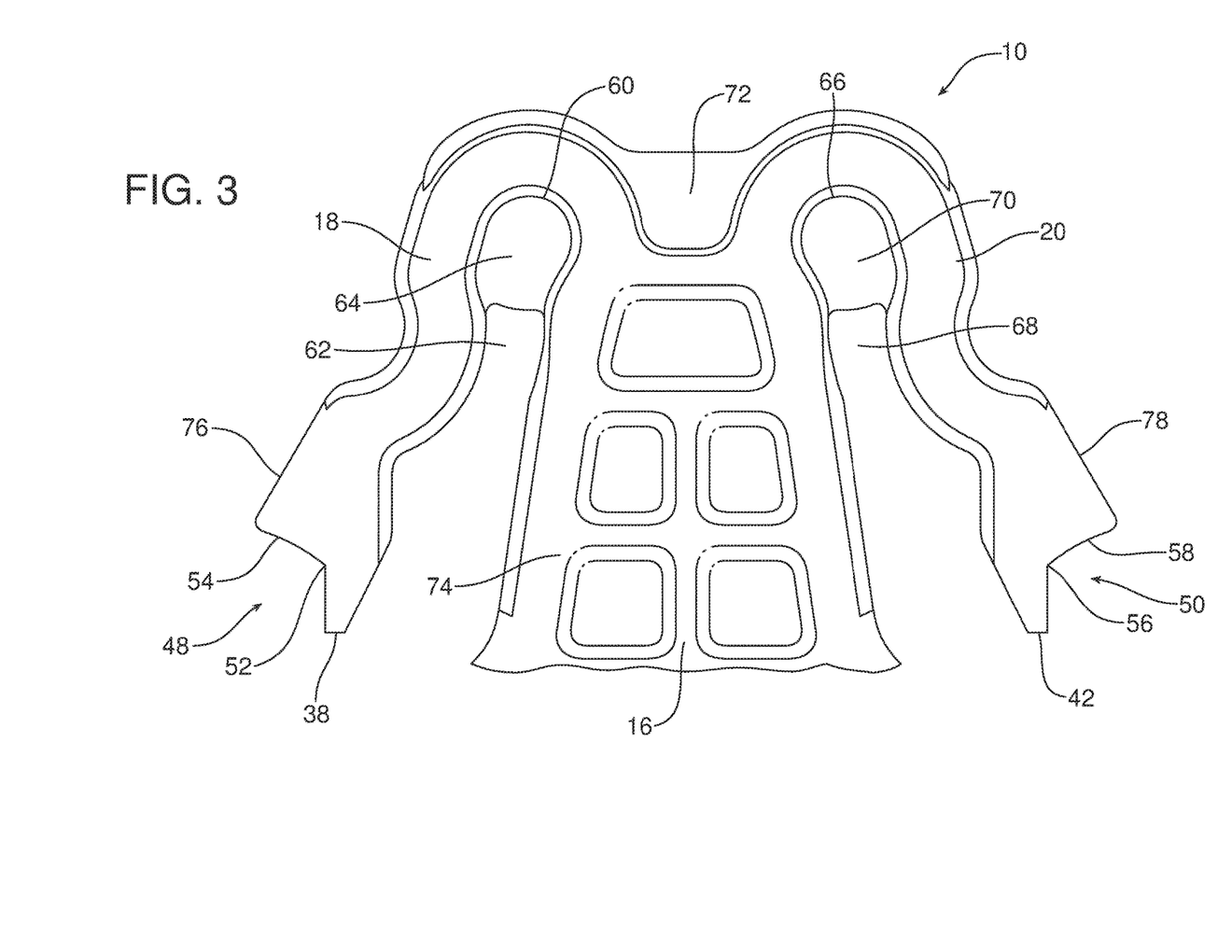
FIG. 3 is a detailed side elevational view illustrating the three gussets that are used to strengthen and reinforce the first cantilever bar and second cantilever bar of the spring clip body.

As further illustrated in FIGS. 1 and 3, the first distal end 38 of the first cantilever bar 18 includes a first double blocked notch 48. Similarly, the second distal end 42 of the second cantilever bar 20 includes a second double blocked notch 50. The first double blocked notch 48 includes a first midpoint angle 52 and a first radiused face 54 so that the first double blocked notch 48 has a substantially V-shape. Similarly, the second double blocked notch 50 includes a second midpoint angle 56 and a second radiused face 58 so that the second double blocked notch 50 is a substantially V-shaped configuration. The first radiused face 54 and the second radiused face 58 are spaced a third distance $D_3$ from the base 14 where $D_1<D_2<D_3$. The difference in the third distance $D_3$ and the second distance $D_2$ is approximately equal to the thickness of the workpiece or sheet metal body component $W_2$ to which the spring clip 10 is to be connected.

As best illustrated in FIG. 3, the first cantilever bar 18 includes a first bend 60 adjacent the support post 16. As clearly illustrated in FIG. 3, the first cantilever bar 18 forms a first neck 62 with the support post 16. A first gusset 64 extends inside the first bend 60 between the support post 16 and the first cantilever bar 18 inside the first neck 62.

Similarly, the second cantilever bar 20 includes a second bend 66 adjacent the support post 16. Further, the second cantilever bar 20 forms a second neck 68 with the support post 16. A second gusset 70 extends inside the second bend 66 between the support post 16 and the second cantilever bar 20 inside the second neck 68.

Figure 4:
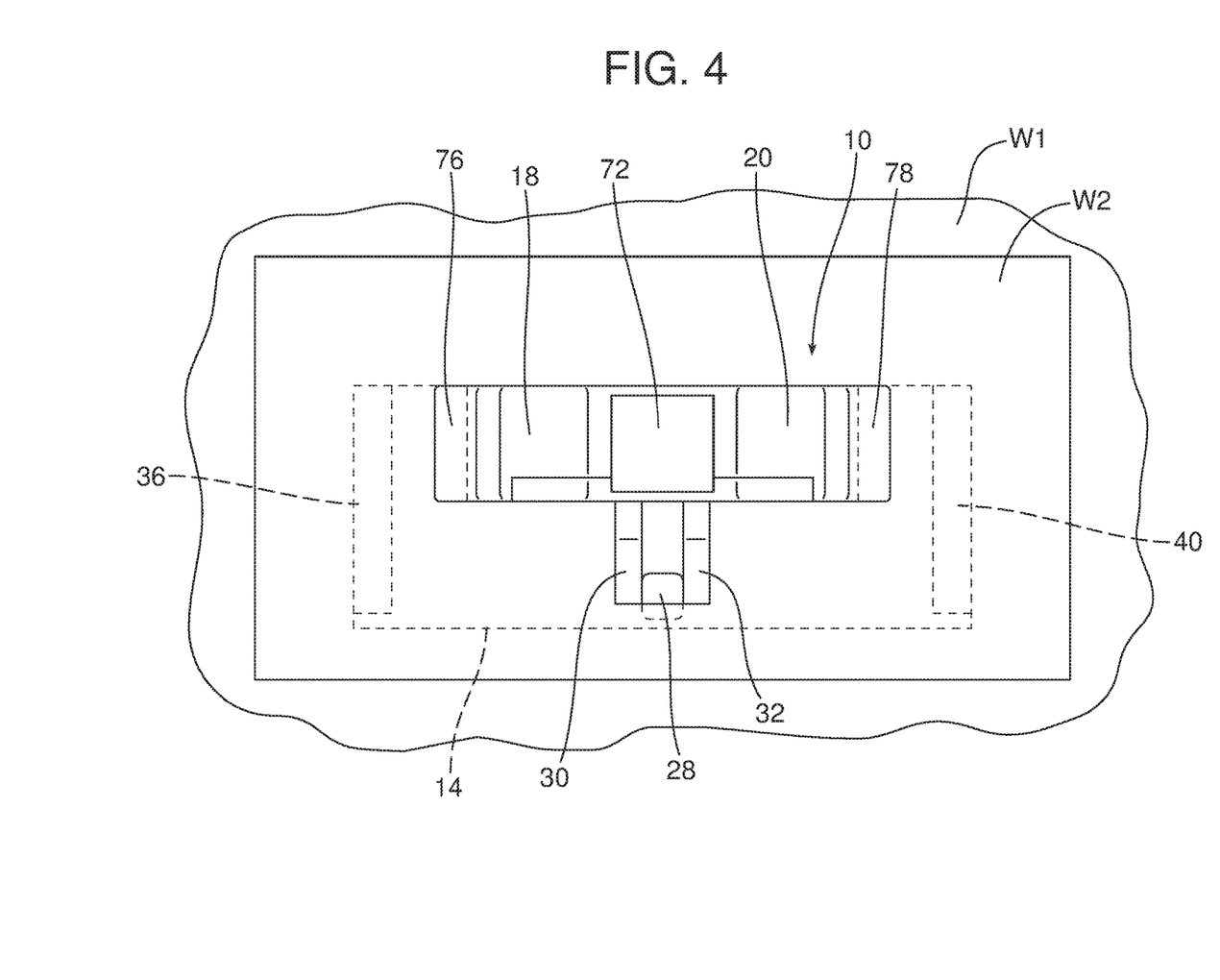
FIG. 4 is a top plan view providing a relative comparison of the cross-sectional area of the third gusset versus the first and second cantilever bars and the support post.

As further illustrated in FIGS. 3 and 4, a third gusset 72 extends outside the first bend 62 and the second bend 66 between the first cantilever bar 18, the second cantilever bar 20 and the support post 16. As should be appreciated, the first gusset 64, the second gusset 70 and the third gusset 72 are not as thick as the first cantilever bar 18, the second cantilever bar 20 and the support post 16 and, therefore, have a smaller cross-sectional area. As a result, while the first gusset 64 and third gusset 72 increase the strength of the first cantilever bar 18 and the second gusset 70 and the third gusset 72 increase the strength of the second cantilever bar 20, the gussets still allow for the necessary bending and flexing of the first and second cantilever bars to allow the spring clip 10 to be used as a resilient connector or fastener between a workpiece W1 and a sheet metal body component W2 (See FIGS. 5-6).

Figure 5:
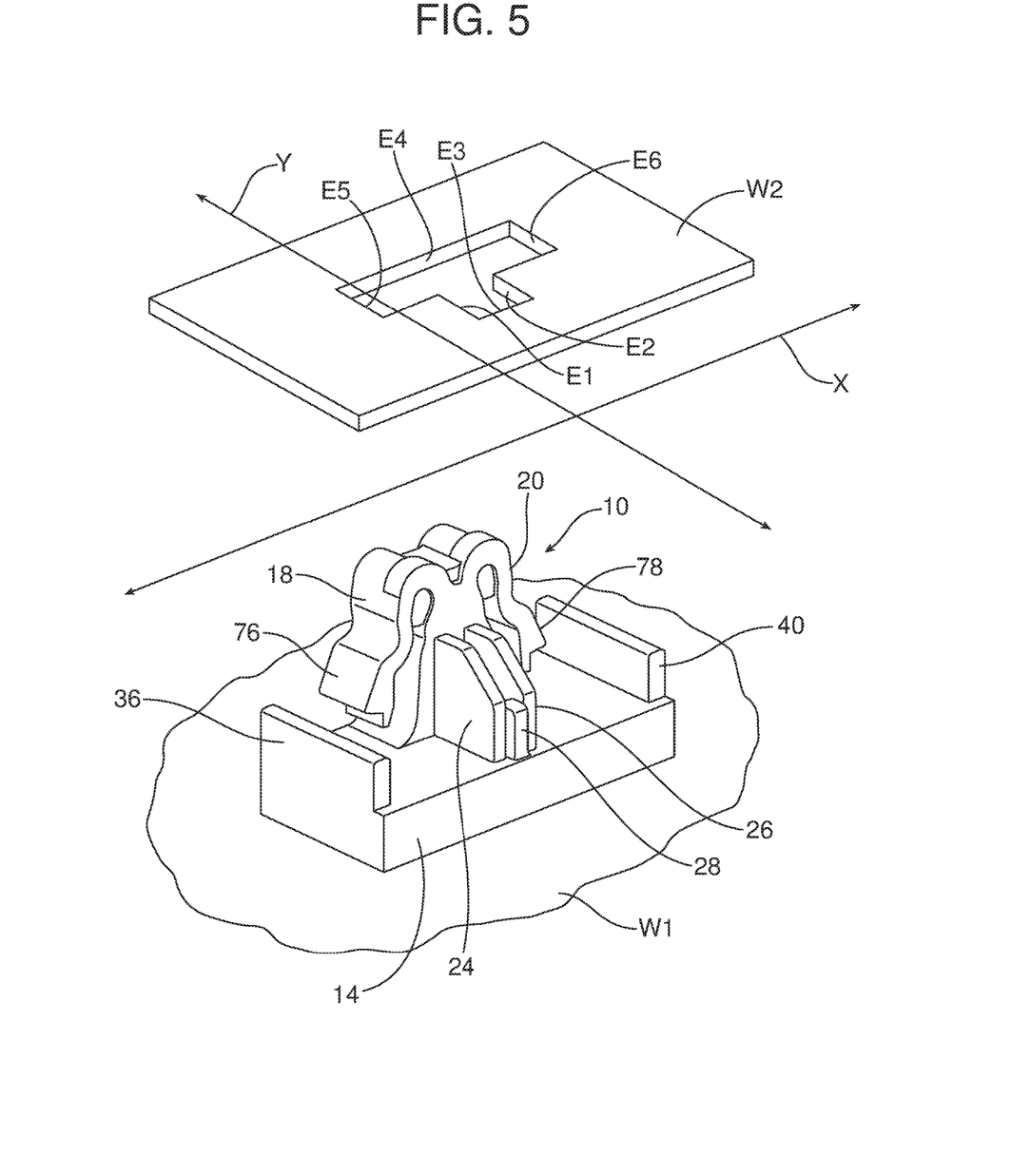
Figure 6:
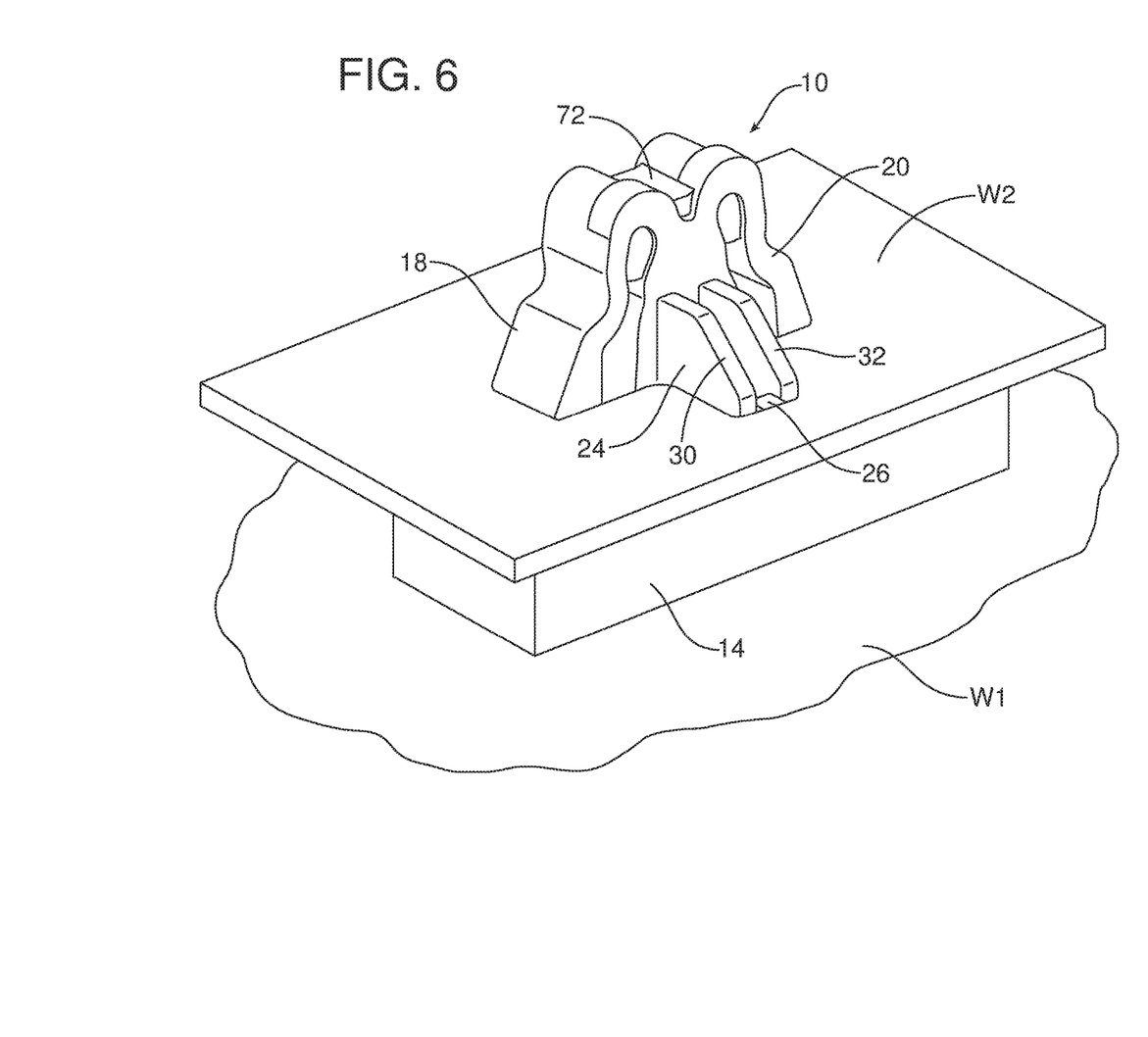

More specifically, in the embodiment illustrated in FIGS. 5 and 6, the spring clip 10 is integrally molded as a part of the plastic workpiece W1. When one wishes to connect the plastic workpiece W1 to the sheet metal component W2, one aligns the top of the body 12 with the mounting aperture A in the sheet metal component. As illustrated in FIG. 5, the mounting aperture A is substantially T-shaped. As the spring clip 10 is inserted into the mounting aperture A the 4-way locator 22 ensures proper alignment and orientation of the plastic workpiece W1 with the sheet metal component $W_2$. More specifically, the first beveled sidewall 24 and the second beveled sidewall 26 engage the edges E1, E2 of the aperture A ensuring proper orientation along the X axis. At the same time, first edge bevel 30 and the second edge bevel 32 of the first beveled sidewall 24 and second beveled sidewall 26 engage the edge E3 of the aperture A and the face 74 of the support post 16 opposite the 4-way connector 22 (see FIG. 3) engages the edge E4 of the aperture to ensure proper orientation along the Y axis thereby providing full 4-way locator function.

As the spring clip 10 is further inserted into the aperture A, the cam surface 76 of the first cantilever bar 18 engages the edge E5 of the aperture A while the cam surface 78 on the second cantilever bar 20 engages the edge E6 of the aperture A. This causes the resilient first cantilever bar 18 and resilient second cantilever bar 20 to flex about the respective first bend 60 and second bend 66 and pivot inwardly toward the support post 16. Just as the first support edge 34 of the first tunable rib 28, the second support edge 44 of the second tunable rib 37 and the third support edge 46 of the third tunable rib 40 come into contact with the face of the sheet metal component W2, the cam faces of 74, 76 clear the sheet metal component W2 and the first and second cantilever bars 18, 20 spring outwardly away from the support post 16 about the first and second bends 60, 66 with the sheet metal component W2 being now received and fully seated in the first and second double blocked notches 48, 50.

As should be appreciated, in this fully seated position, the margin of the sheet metal component W2 provided around the aperture A is effectively captured between the first cantilever bar 18 and second cantilever bar 20 on one side and the first, second and third support edges 34, 44, 46 on the other. As noted earlier the distance gap between $D_2$ and $D_3$ substantially corresponds to the thickness of the sheet metal component W2 so as to accommodate the connection between the parts W1 and W2 with the spring clip 10. Thus, it should be appreciated that the height of the ribs 28, 36 and 40 may be adjusted or tuned in order to provide a good, rattle free connection between the workpiece W1 and the sheet metal component W2.

Should it ever become necessary to disconnect the workpiece W1 from the sheet metal component W2 for service or any other reason, it is possible to pry the workpiece W1 away from the sheet metal component and overcome the resilient holding power of the spring clip 10. When this is done, the ends E3, E4 of the mounting aperture A slide up the radiused faces 54, 58 of the notches 48, 50 causing the two cantilever bars 18, 20 to bend slightly inward toward the support post 16 until the aperture is free of the notches to allow easy separation.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A spring clip, comprising:
a body having (a) a base, (b) a support post carried on said base, (c) a first cantilever bar carried on said support post, (d) a second cantilever bar carried on said support post, (e) a first gusset extending between and engaging said support post and said first cantilever bar, (f) a second gusset extending between and engaging said support post and said second cantilever bar and (g) a third gusset extending between said first cantilever bar, said second cantilever bar and said support post.

2. The spring clip of claim 1, wherein said first cantilever bar includes a first bend adjacent said support post.

3. The spring clip of claim 2, wherein said first cantilever bar forms a first neck with said support post.

4. The spring clip of claim 3, wherein said first gusset extends inside said first bend inside said first neck.

5. The spring clip of claim 4, wherein said second cantilever bar includes a second bend adjacent said support post.

6. The spring clip of claim 5, wherein said second cantilever bar forms a second neck with said support post.

7. The spring clip of claim 6, wherein said second gusset extends inside said second bend inside said second neck.

8. The spring clip of claim 7, wherein said third gusset extends outside said first bend and said second bend.

9. The spring clip of claim 1, wherein the body is molded from a single piece of plastic such that the base, the support post, the first cantilever bar and the second cantilever bar are integral with one another.

10. The spring clip of claim 1, wherein the body is molded from a single piece of composite material such that the base, the support post, the first cantilever bar and the second cantilever bar are integral with one another.

* * * * *